United States Patent
Pratuangman et al.

(10) Patent No.: US 11,554,825 B2
(45) Date of Patent: Jan. 17, 2023

(54) ATTACHMENT STRUCTURE OF SMART KEY UNIT FOR MOTORCYCLE

(71) Applicant: HONDA MOTOR CO., LTD., Tokyo (JP)

(72) Inventors: Nabhayatra Pratuangman, Bangkok (TH); Rungroj Saravichai, Bangkok (TH); Wisarut Nunavarattanakul, Bangkok (TH)

(73) Assignee: Honda Motor Co., Ltd., Tokyo (JP)

( * ) Notice: Subject to any disclaimer, the term of this patent is extended or adjusted under 35 U.S.C. 154(b) by 303 days.

(21) Appl. No.: 16/753,491

(22) PCT Filed: Oct. 10, 2017

(86) PCT No.: PCT/TH2017/000073
§ 371 (c)(1),
(2) Date: Apr. 3, 2020

(87) PCT Pub. No.: WO2019/074449
PCT Pub. Date: Apr. 18, 2019

(65) Prior Publication Data
US 2020/0324839 A1    Oct. 15, 2020

(51) Int. Cl.
*B62H 5/08* (2006.01)
*B60R 25/24* (2013.01)
*B62K 23/02* (2006.01)

(52) U.S. Cl.
CPC ............... *B62H 5/08* (2013.01); *B60R 25/24* (2013.01); *B62K 23/02* (2013.01); *B60R 2325/306* (2013.01)

(58) Field of Classification Search
CPC .. B62H 5/08; B62H 5/00; B60R 25/24; B60R 2325/306; B60R 25/20; B62K 23/02
See application file for complete search history.

(56) References Cited

U.S. PATENT DOCUMENTS

| 5,291,067 A | * | 3/1994 | Nakajima | B62H 5/00 70/252 |
| 6,244,083 B1 | * | 6/2001 | Carcarino | F02B 61/045 70/242 |

(Continued)

FOREIGN PATENT DOCUMENTS

| CN | 103253232 A | 8/2013 |
| JP | 6023729 B2 | 11/2016 |

OTHER PUBLICATIONS

Office Action dated Jun. 17, 2021 issued in the corresponding Chinese Patent Application No. 201780093887.5.
(Continued)

*Primary Examiner* — Brian E Miller
(74) *Attorney, Agent, or Firm* — Carrier Shende & Associates, P.C.; Joseph P. Carrier; Fulchand P. Shende

(57) ABSTRACT

To provide an attachment structure of a smart key unit for a motorcycle that can reduce a size of an attachment structure of a smart key unit around a head pipe. In an attachment structure of a smart key unit for a motorcycle that can cause an engine of a motorcycle to be in a startable state under a condition that an ID code transmitted from a smart key K that can be carried by a driver matches a normal ID code, the smart key unit is attached at a position in the rear of a head pipe included in a vehicle, and the smart key unit is arranged in a state in which a longitudinal direction M thereof is substantially orthogonal to a back and forth direction of the vehicle.

11 Claims, 12 Drawing Sheets

(56) References Cited

U.S. PATENT DOCUMENTS

| | | | | |
|---|---|---|---|---|
| 6,354,120 B1* | 3/2002 | Tan | ............... | B60R 25/02153 |
| | | | | 70/252 |
| 6,457,743 B1* | 10/2002 | Steffens, Jr. | ............ | B62D 1/10 |
| | | | | 74/552 |
| 6,549,115 B1* | 4/2003 | Daiss | .................. | B60R 25/24 |
| | | | | 340/5.31 |
| 6,948,472 B2* | 9/2005 | Suzuki | ............... | B60R 25/2063 |
| | | | | 180/311 |
| 7,134,706 B2 | 11/2006 | Michisaka et al. | | |
| 7,299,669 B1* | 11/2007 | Chung | ................. | B60R 25/04 |
| | | | | 70/252 |
| 7,347,071 B2* | 3/2008 | Nakai | ..................... | B62H 5/02 |
| | | | | 70/423 |
| 7,968,811 B2* | 6/2011 | Davidson | .............. | B62H 5/08 |
| | | | | 200/43.08 |
| 2001/0022248 A1* | 9/2001 | Mori | ....................... | B62H 5/00 |
| | | | | 180/219 |
| 2004/0090306 A1* | 5/2004 | Konno | ............. | B60R 25/02153 |
| | | | | 340/5.62 |
| 2004/0256204 A1* | 12/2004 | Suzuki | ................... | B60R 25/04 |
| | | | | 200/43.03 |
| 2006/0279402 A1* | 12/2006 | Okamitsu | ............. | B60R 25/04 |
| | | | | 340/5.72 |
| 2007/0247280 A1* | 10/2007 | Nakamura | ............. | B60R 25/24 |
| | | | | 340/5.72 |
| 2008/0030327 A1* | 2/2008 | Yoshizawa | ............. | B60R 25/04 |
| | | | | 340/540 |
| 2008/0172154 A1* | 7/2008 | Tanaka | ................ | B60R 16/0231 |
| | | | | 701/36 |
| 2008/0309453 A1* | 12/2008 | Kim | ........................ | B60R 25/04 |
| | | | | 340/5.6 |
| 2009/0000924 A1* | 1/2009 | Davidson | ................ | B62H 5/08 |
| | | | | 200/43.08 |
| 2009/0031767 A1* | 2/2009 | Ko | ......................... | B60R 25/04 |
| | | | | 70/336 |
| 2010/0229611 A1* | 9/2010 | Konno | .................. | B62K 23/04 |
| | | | | 70/252 |
| 2011/0074562 A1* | 3/2011 | Ramirez | ............... | B60R 25/104 |
| | | | | 340/427 |
| 2011/0277519 A1* | 11/2011 | Hirashita | ............. | B60R 25/2063 |
| | | | | 70/237 |
| 2015/0203071 A1* | 7/2015 | Kinoshita | ........... | B60R 25/0215 |
| | | | | 180/287 |
| 2015/0203164 A1* | 7/2015 | Kinoshita | ................ | B62H 5/00 |
| | | | | 701/1 |
| 2017/0129457 A1* | 5/2017 | Lee | ........................ | B60R 25/248 |
| 2018/0281571 A1* | 10/2018 | Jergess | ................. | B60J 7/0038 |
| 2020/0031415 A1* | 1/2020 | Shibuya | .................. | B62J 45/20 |
| 2022/0063743 A1* | 3/2022 | Wu | ......................... | B62J 17/02 |

OTHER PUBLICATIONS

Office Action, First Examination Report, with a dated Nov. 4, 2020, issued in the corresponding Indian Patent Application No. 202017006302.

PCT/ISA/210 from International Application PCT/TH2017/000073.

\* cited by examiner

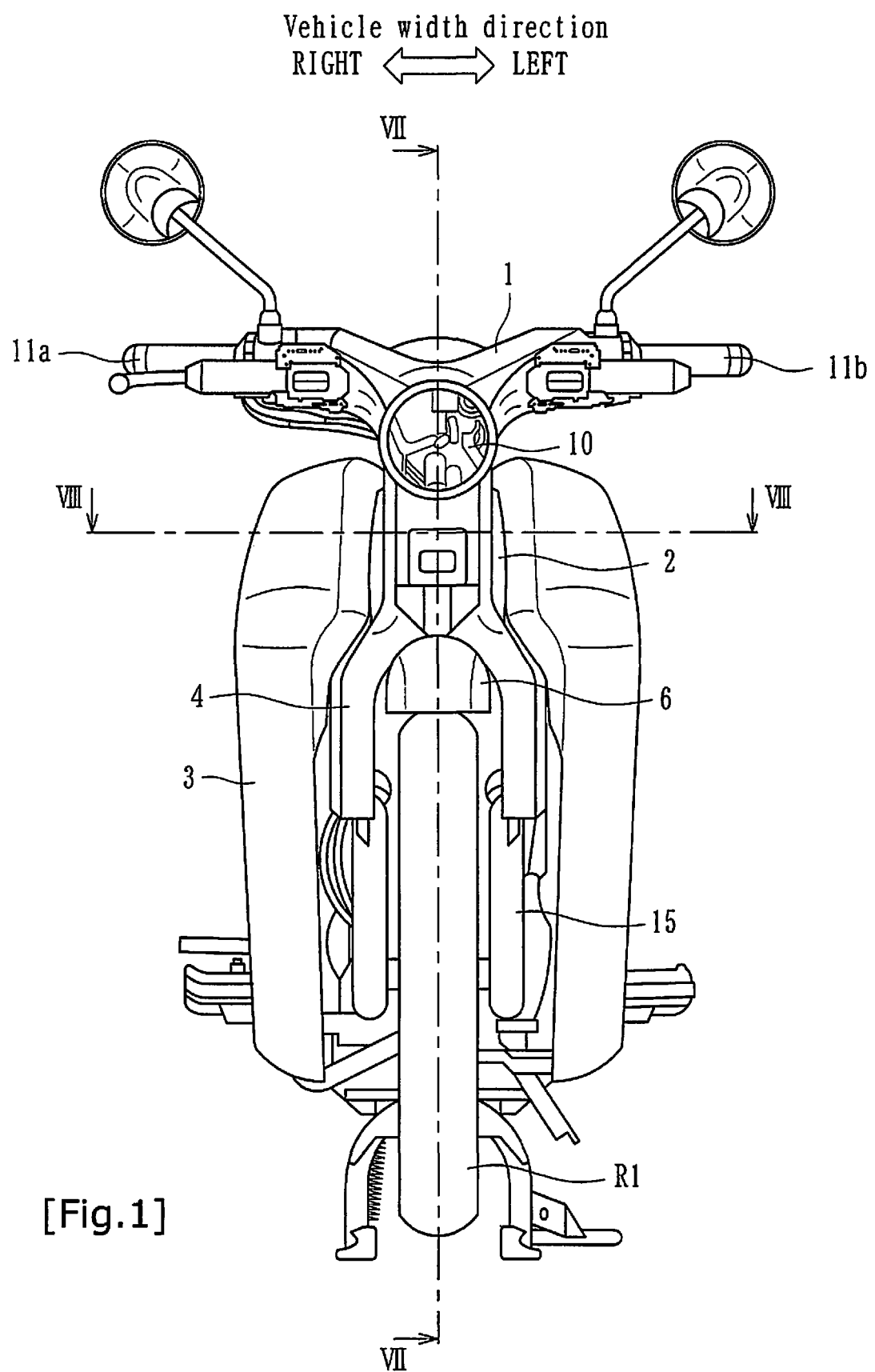
[Fig.1]

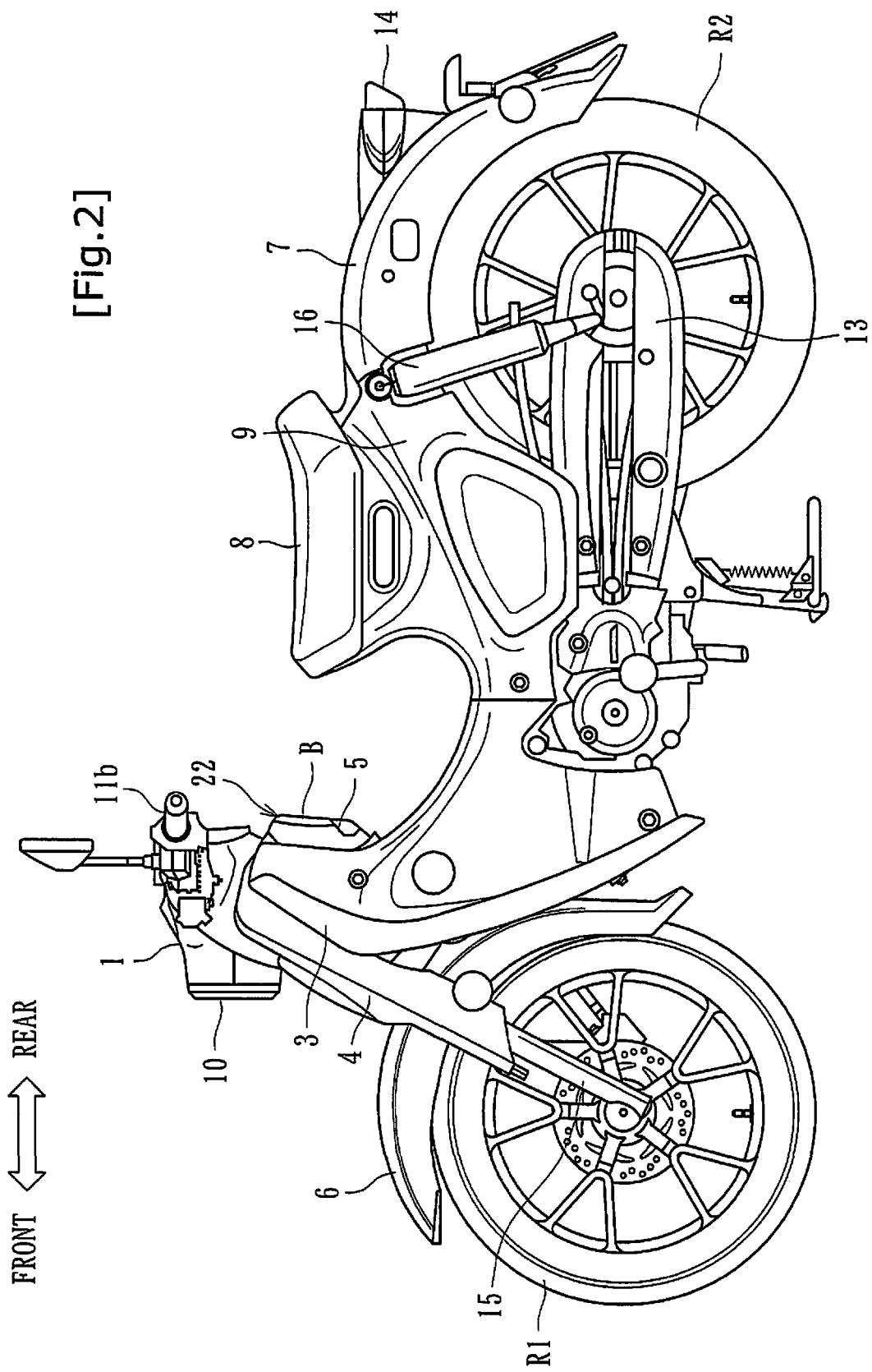
[Fig.2]

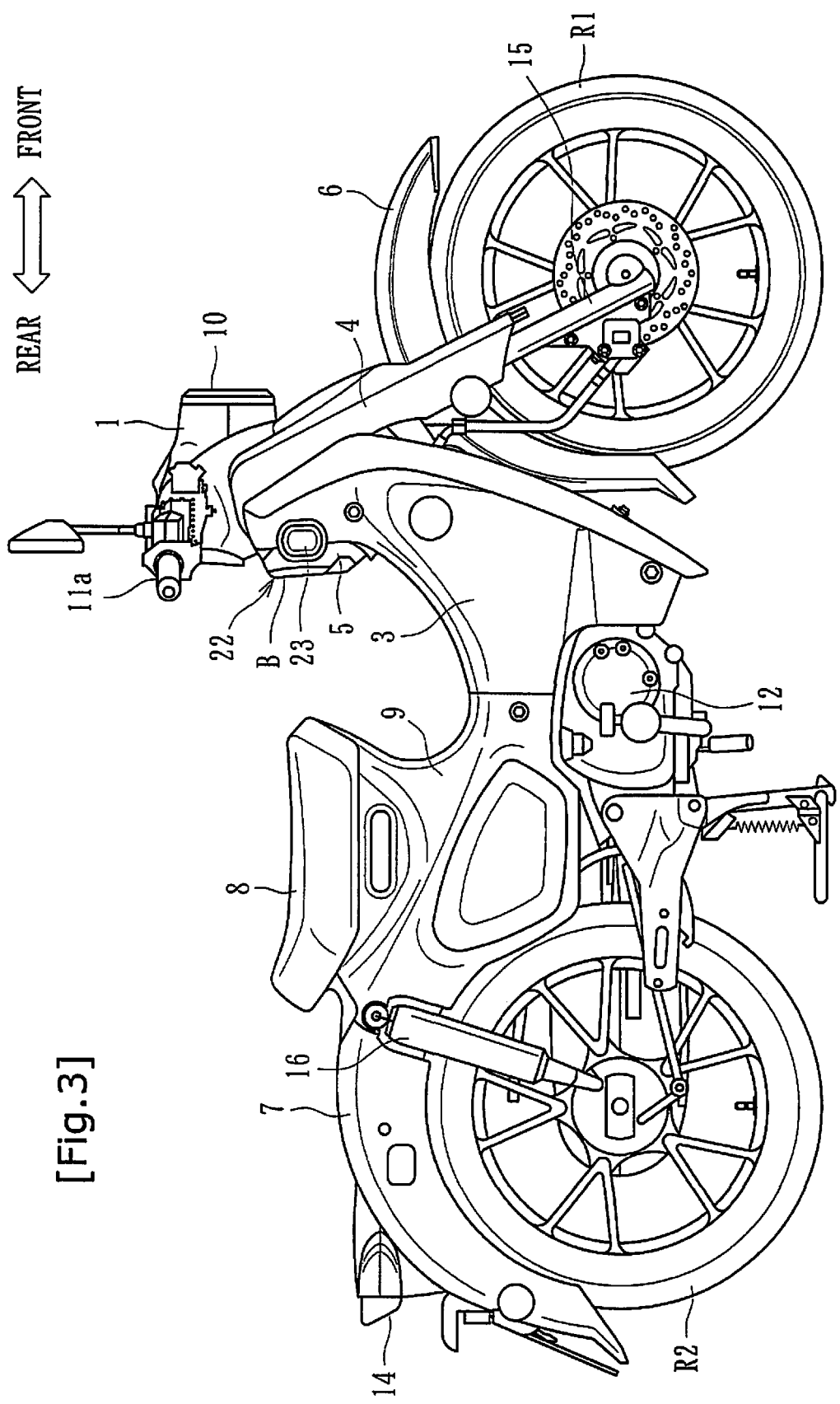
[Fig.3]

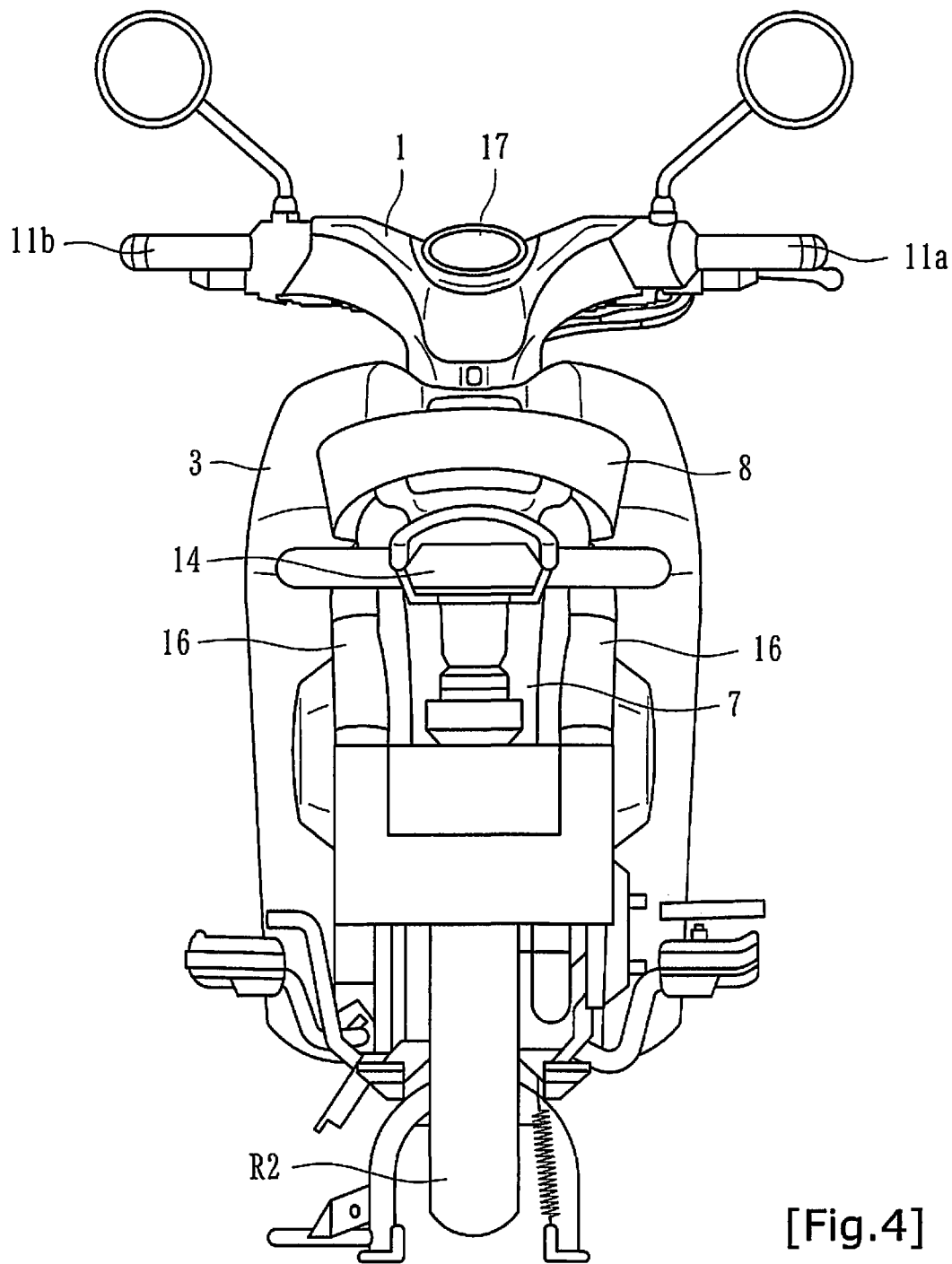
[Fig.4]

[Fig.5]
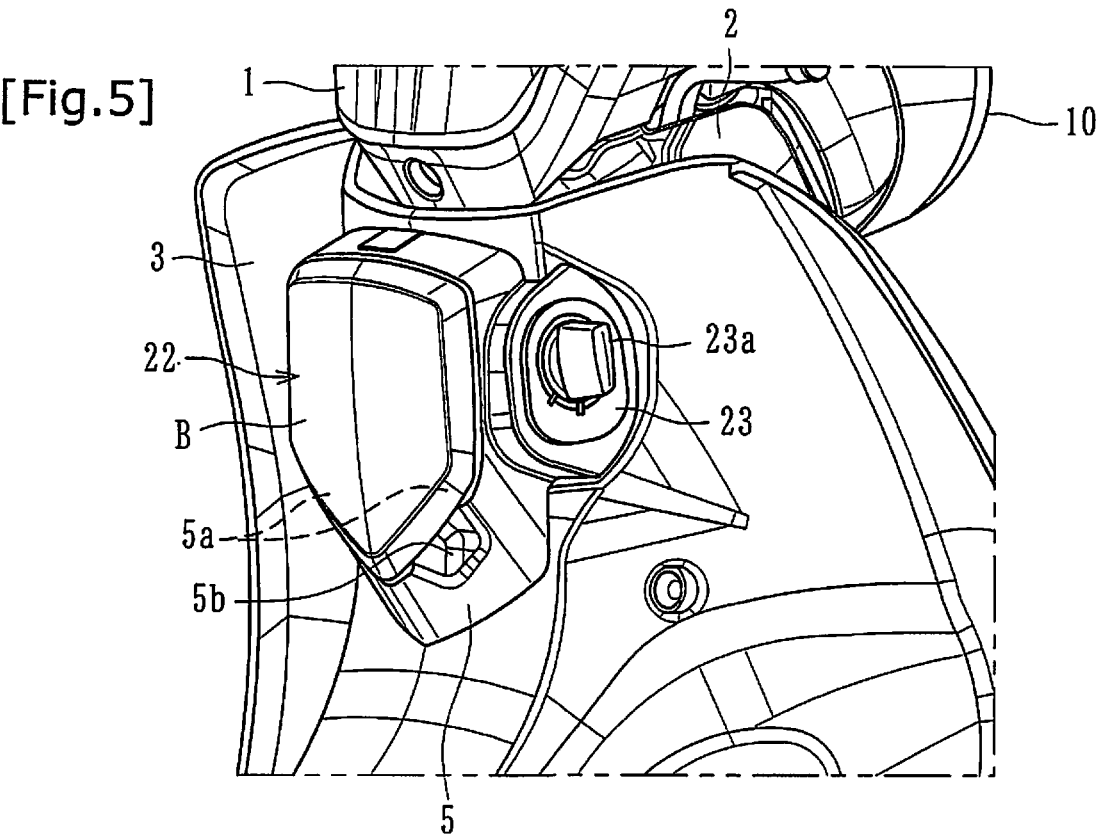
[Fig.6]
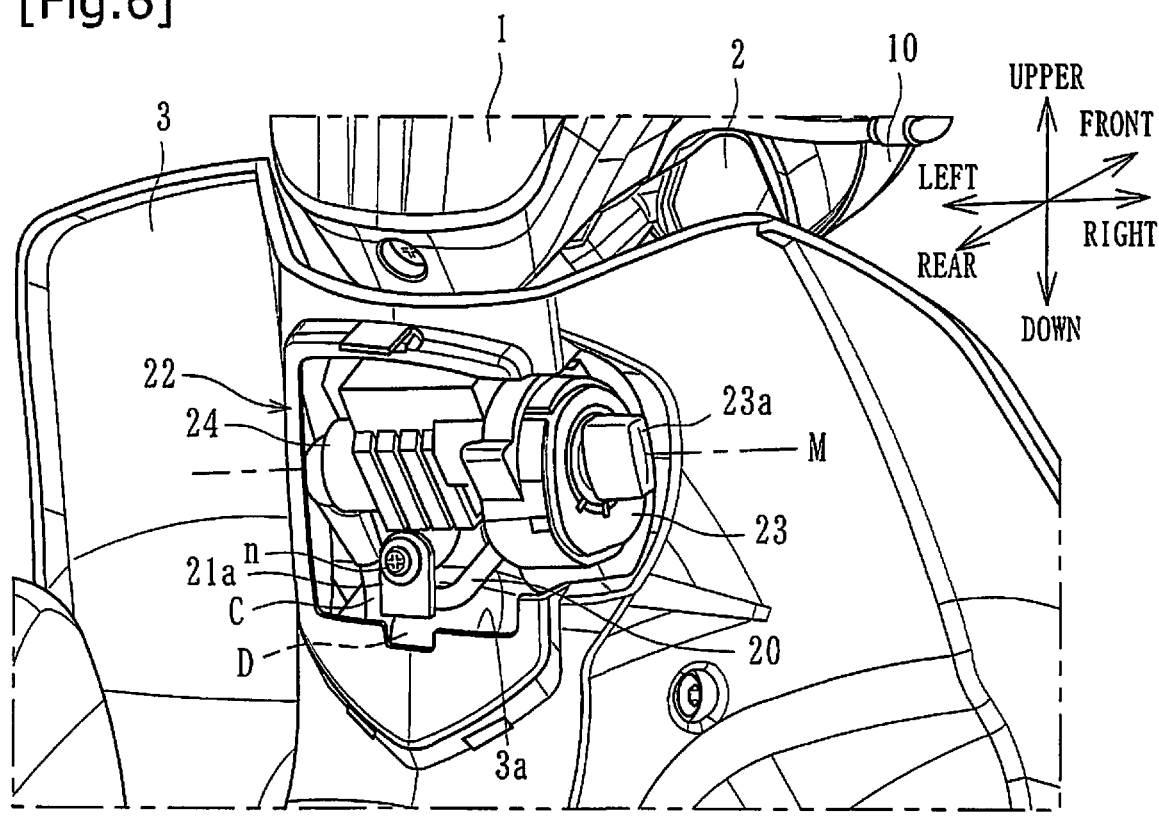

[Fig.7]
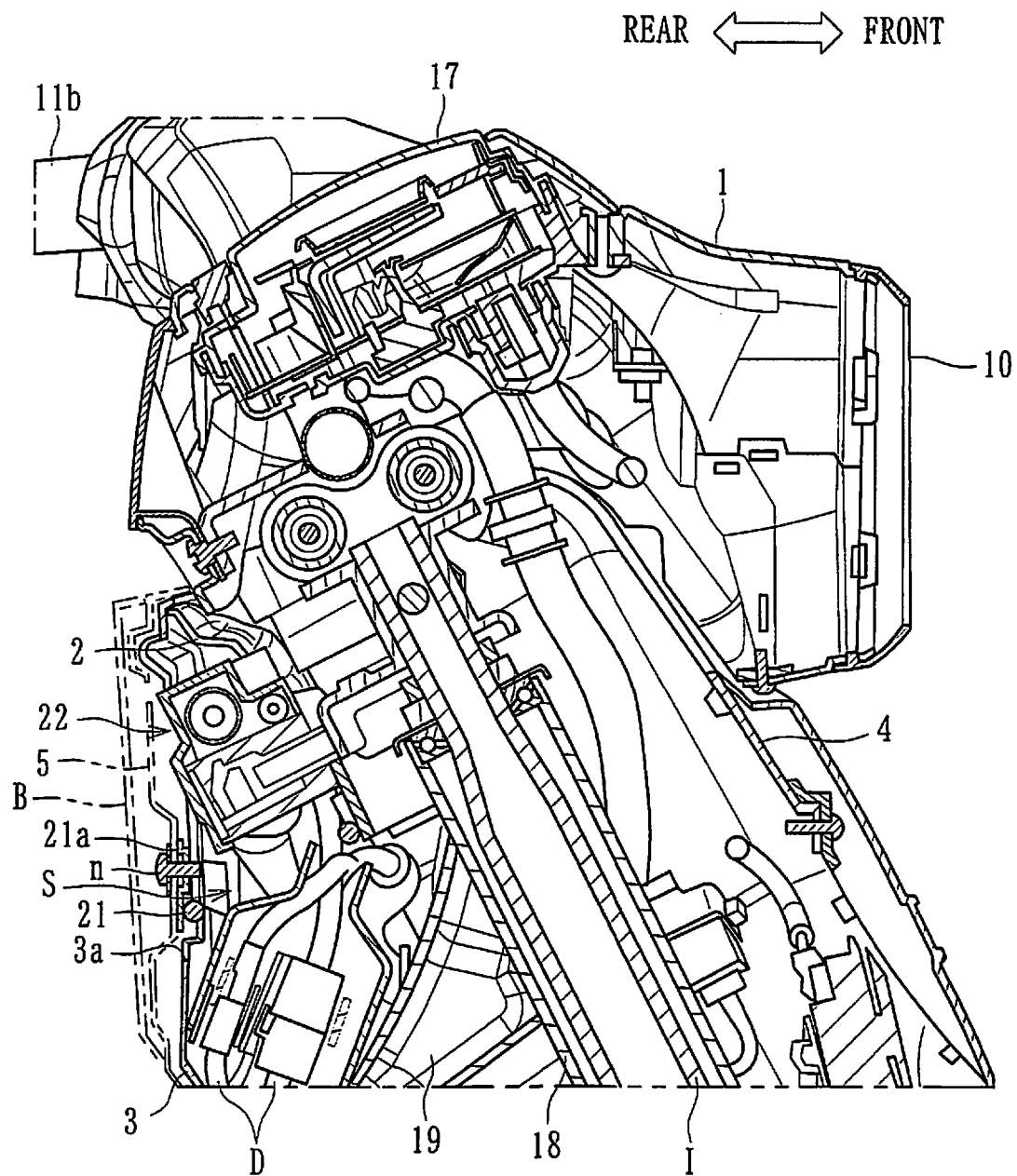

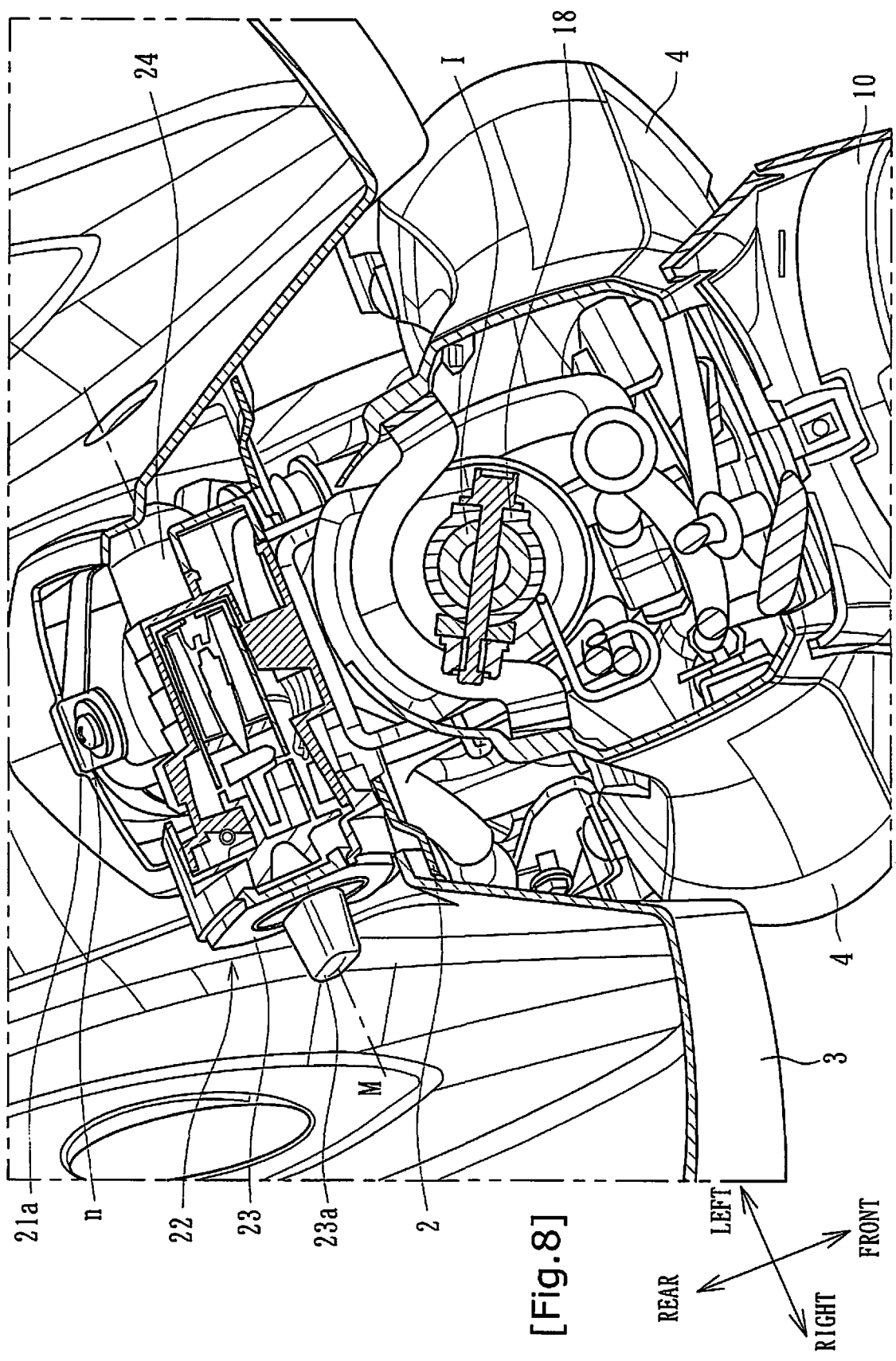
[Fig.8]

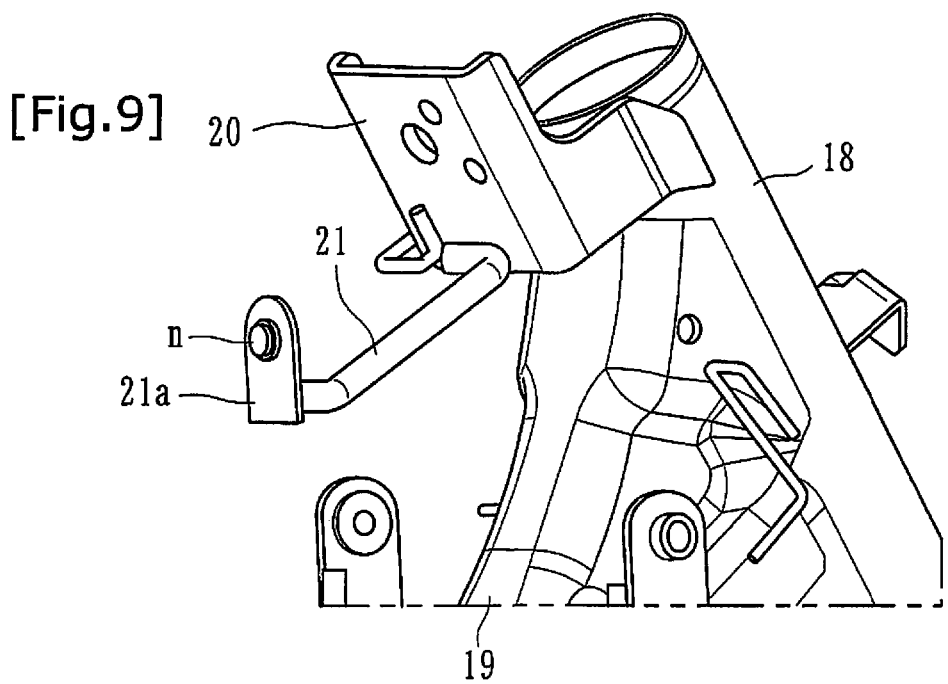
[Fig.9]
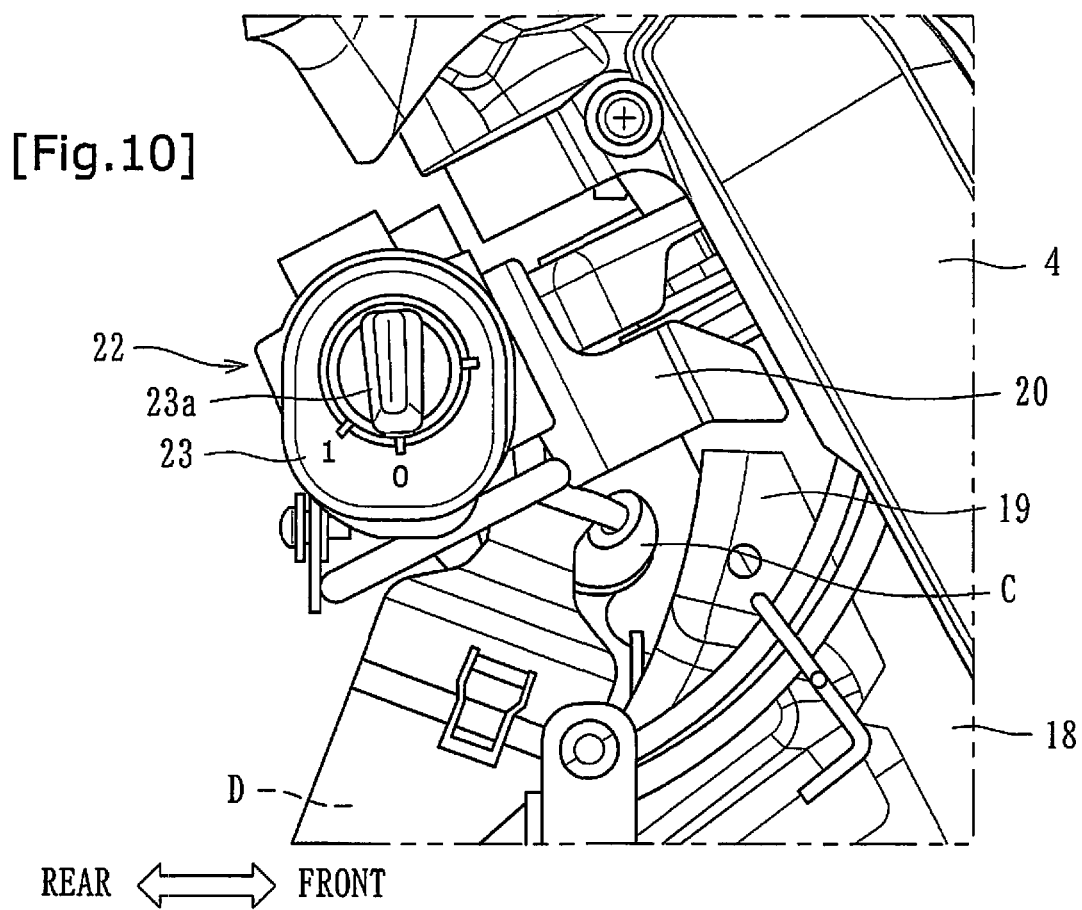
[Fig.10]
REAR ⟷ FRONT

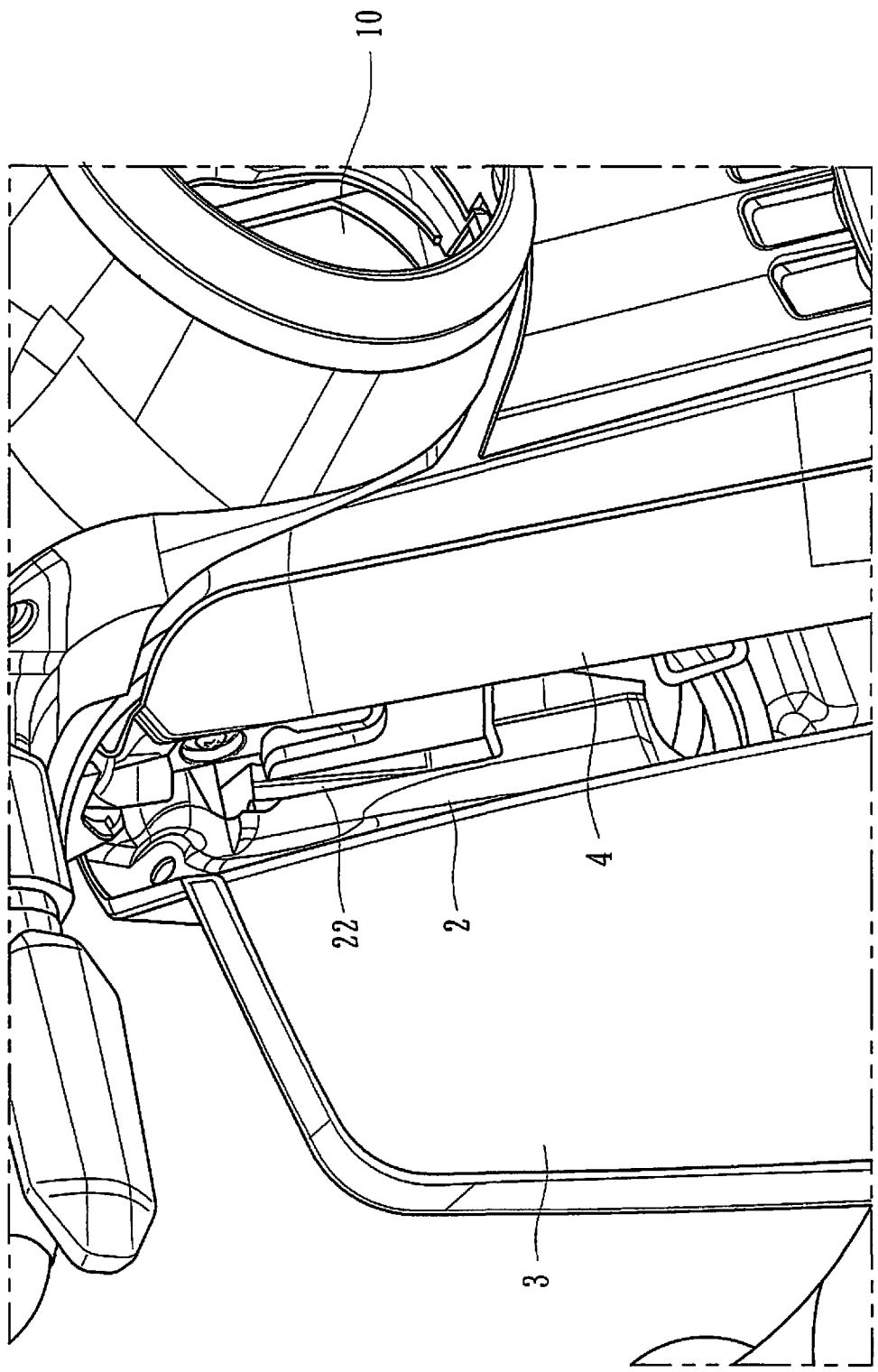
[Fig.11]

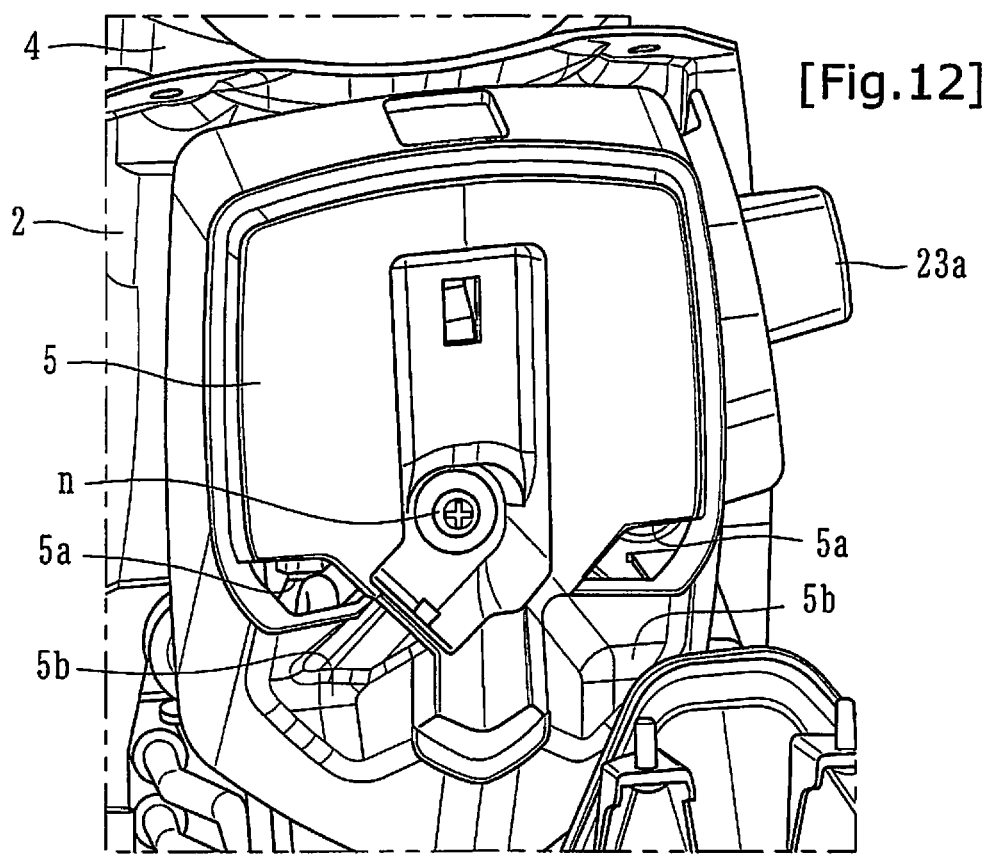
[Fig.12]
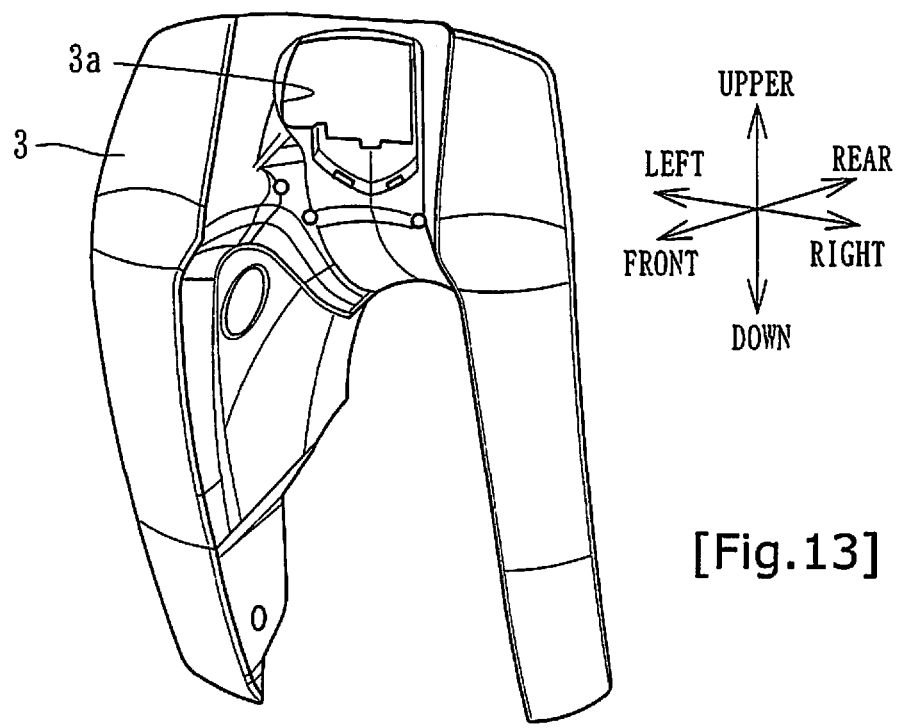
[Fig.13]

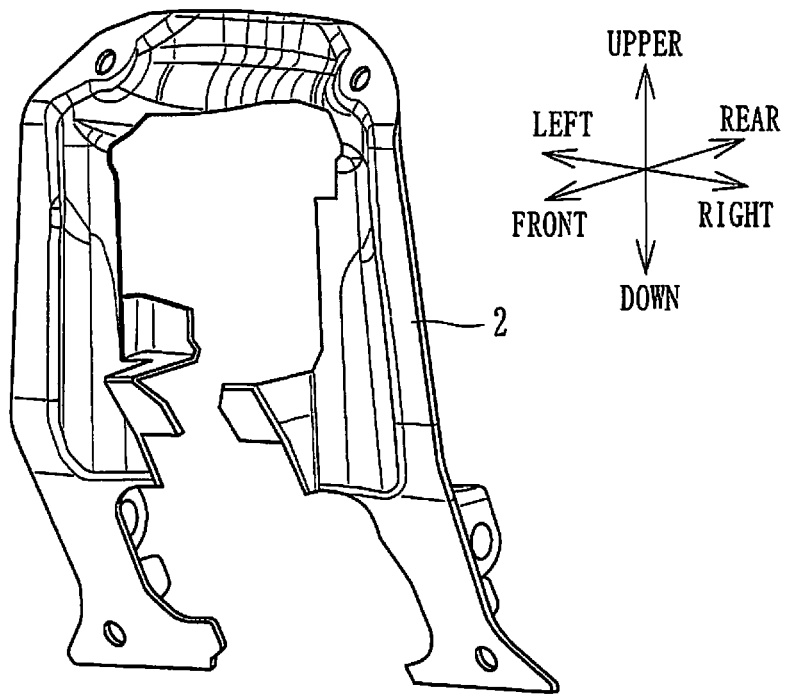
[Fig.14]
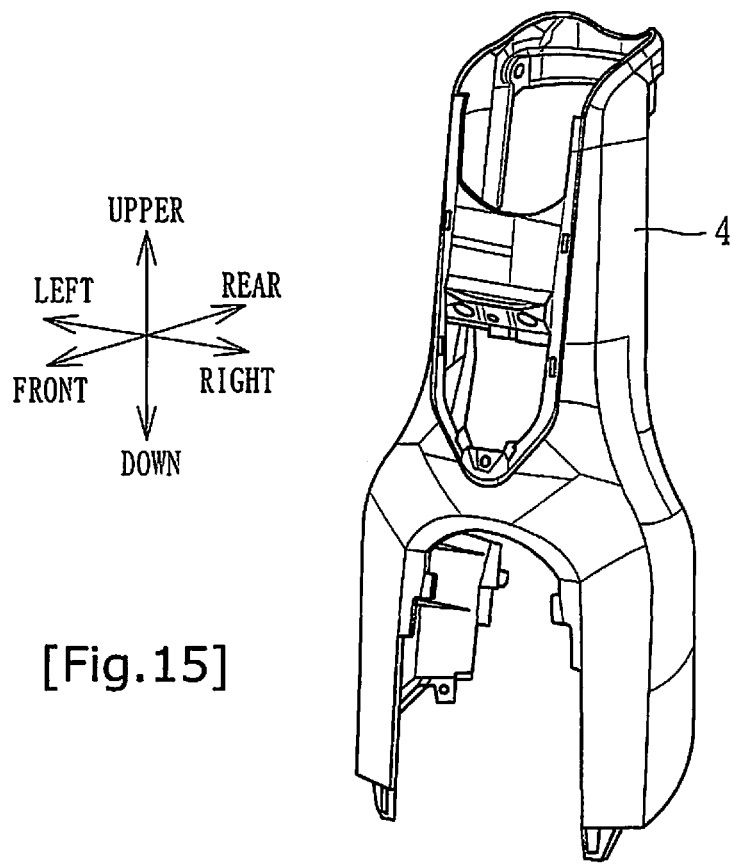
[Fig.15]

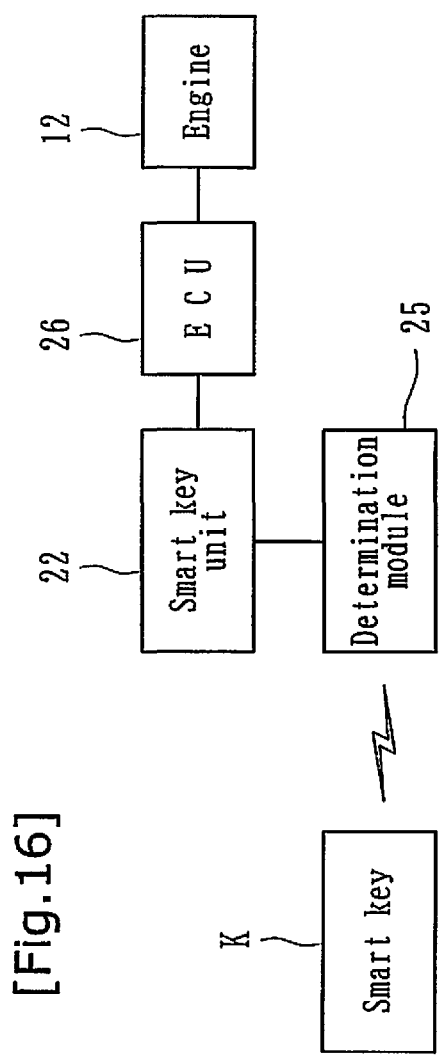
[Fig.16]

ATTACHMENT STRUCTURE OF SMART KEY UNIT FOR MOTORCYCLE

TECHNICAL FIELD

The present invention relates to an attachment structure of a smart key unit for a motorcycle that can cause a driving source of a motorcycle to be in a startable state under a condition that an ID code transmitted from a smart key that can be carried by a driver matches a normal ID code.

BACKGROUND ART

In the related art, developed is a motorcycle including a smart key unit that can communicate with a smart key that can be carried by a driver and can cause a driving source of the motorcycle to be in a startable state under a condition that an ID code transmitted from the smart key matches a normal ID code. As disclosed in Patent Literature 1, for example, such a smart key unit includes an operation module that is attached to a side (in a vehicle width direction) of a head pipe of the motorcycle, and can be operated only when the ID code transmitted from the smart key matches the normal ID code.

CITATION LIST

Patent Literature

Patent Literature 1: Japanese Patent No. 6023729

SUMMARY OF INVENTION

Technical Problem

However, in the related art described above, the smart key unit is attached to the side (in the vehicle width direction) of the head pipe of the motorcycle, so that there has been the problem that an attachment structure of the smart key unit is upsized. That is, the smart key unit typically includes a lock mechanism and the like for locking an operation of the operation module in a state of not receiving the normal ID code, so that the size of the smart key unit has to be increased as compared with a general key unit operated with an ignition key. Accordingly, when such a smart key unit is attached to the side of the head pipe, the size of the attachment structure around a head pipe has to be increased in the vehicle width direction.

Specifically, when the smart key unit is attached to the side of the head pipe, a clearance needs to be secured between a head pipe cover and the smart key unit to prevent interference with the head pipe cover interlocking with a steering during steering, so that the size of the attachment structure around the head pipe may be further increased in the vehicle width direction.

The present invention is made in view of such a situation, and provides an attachment structure of a smart key unit for a motorcycle that can reduce the size of the attachment structure of the smart key unit around the head pipe.

Solution to Problem

According to the invention of claim 1, there is provided an attachment structure of a smart key unit for a motorcycle capable of performing predetermined authentication by communicating with a smart key that is able to be carried by a driver, wherein the smart key unit is attached at a position in the rear of a head pipe included in a vehicle, and the smart key unit is arranged in a state in which a longitudinal direction of the smart key unit is substantially orthogonal to a back and forth direction of the vehicle.

According to the invention of claim 2, in the attachment structure of the smart key unit for a motorcycle according to claim 1, the smart key unit is arranged in a state in which the longitudinal direction of the smart key unit is substantially parallel with the width direction of the vehicle.

According to the invention of claim 3, in the attachment structure of the smart key unit for a motorcycle according to claim 1 or 2, an operation module that is able to operate the driving source to start is arranged on one end face in a longitudinal direction of the smart key unit, and a cable connector that is able to be electrically connected to other electric components included in a motorcycle is arranged on the other end face.

According to the invention of claim 4, in the attachment structure of the smart key unit for a motorcycle according to one of claims 1 to 3, on the head pipe, a stay is formed that inclines toward a rear side of the vehicle and supports the smart key unit, a main frame is extended toward the rear side of the vehicle, and a leg shield is attached at a position closer to the rear side of the vehicle than the smart key unit supported by the stay, and a space surrounded by the head pipe, the main frame, and the leg shield is prepared as a housing space that is able to house cables extended from the smart key unit and other electric components included in the vehicle.

Advantageous Effects of Invention

According to the invention of claim 1, the smart key unit is attached at a position in the rear of the head pipe included in the vehicle, and the smart key unit is arranged in a state in which the longitudinal direction of the smart key unit is substantially orthogonal to the back and forth direction of the vehicle, so that a clearance for preventing interference during steering can be secured while suppressing increase in a projecting dimension in the back and forth direction of the vehicle around the head pipe, and the size of the attachment structure of the smart key unit around the head pipe can be reduced.

According to the invention of claim 2, the smart key unit is arranged in a state in which the longitudinal direction of the smart key unit is substantially parallel with the width direction of the vehicle, so that the size of the attachment structure of the smart key unit around the head pipe can be reduced while improving operability for the smart key unit.

According to the invention of claim 3, in the smart key unit, the operation module that is able to operate the driving source to start is arranged on one end face in the longitudinal direction of the smart key unit, and the cable connector that can be electrically connected to other electric components included in the motorcycle is arranged on the other end face, so that the operation module and the cable connector are positioned along the horizontal direction on the rear side of the vehicle in the head pipe, and increase in the projecting dimension in the back and forth direction of the vehicle around the head pipe can be further suppressed.

According to the invention of claim 4, on the head pipe, the stay is formed that inclines toward the rear side of the vehicle and supports the smart key unit, the main frame is extended toward the rear side of the vehicle, and the leg shield is attached at a position closer to the rear side of the vehicle than the smart key unit supported by the stay, and the space surrounded by the head pipe, the main frame, and the leg shield is prepared as the housing space that is able to house the cables extended from the smart key unit and other electric components included in the vehicle, so that a dead space positioned below the smart key unit can be effectively utilized as an accommodation space for the cable.

BRIEF DESCRIPTION OF DRAWINGS

FIG. 1 is a front view illustrating a motorcycle to which an attachment structure of a smart key unit for a motorcycle according to an embodiment of the present invention is applied.

FIG. 2 is a left side view illustrating the motorcycle.

FIG. 3 is a right side view illustrating the motorcycle.

FIG. 4 is a back view illustrating the motorcycle.

FIG. 5 is a perspective view illustrating a leg shield and a smart key unit cover of the motorcycle.

FIG. 6 is a perspective view illustrating a state in which the smart key unit cover of the motorcycle is removed and the entire smart key unit is exposed to the outside.

FIG. 7 is a sectional view along line VII-VII in FIG. 1.

FIG. 8 is a sectional view along line VIII-VIII in FIG. 1.

FIG. 9 is a perspective view illustrating a stay formed on a head pipe of the motor cycle and a main frame extended from the head pipe.

FIG. 10 is a side view illustrating a state in which the smart key unit is attached to the stay of the head pipe of the motorcycle.

FIG. 11 is a perspective view illustrating a state of the head pipe and a covering member of the motorcycle during steering.

FIG. 12 is a perspective view illustrating a smart key unit cover attached to the motorcycle.

FIG. 13 is a perspective view illustrating the leg shield.

FIG. 14 is a perspective view illustrating the covering member.

FIG. 15 is a perspective view illustrating a head pipe cover.

FIG. 16 is a block diagram illustrating a smart key system arranged in the motorcycle.

DESCRIPTION OF EMBODIMENTS

The following describes an embodiment of the present invention in detail with reference to the drawings.

An attachment structure of a smart key unit for a motorcycle according to the present embodiment is applied to a motorcycle as illustrated in FIGS. 1 to 4. The motorcycle includes a handle cover 1, a leg shield 3 (refer to FIGS. 1 to 4 and FIG. 13), a head pipe cover 4 (refer to FIGS. 1 to 4 and FIG. 15), a smart key unit cover 5 (refer to FIGS. 1 to 4 and FIG. 12), a front fender 6, a rear fender 7, a seat 8, a side cover 9, a headlight 10, a throttle grip 11*a* and a holding grip 11*b*, an engine 12 serving as a driving source of a vehicle, a belt converter cover 13, a rear light 14, a front fork 15, a rear fork 16, a meter 17, a front wheel R1, and a rear wheel R2.

A smart key unit 22 is attached to the motorcycle according to the present embodiment. The smart key unit 22 can cause the engine 12 (driving source) of the motorcycle to be in a startable state under a condition that an ID code transmitted from a smart key K that can be carried by a driver matches a normal ID code, and is electrically connected to a determination module 25 and an ECU 26 attached to a predetermined position of the vehicle as illustrated in FIG. 16.

Specifically, the smart key K can wirelessly (by radio waves) sends an ID code specific to the motorcycle, and the determination module 25 can receive the sent ID code and determine whether the sent ID code is a normal ID code. If the determination module 25 determines that the normal ID code is received, a control signal is transmitted to the smart key unit 22, and a lock for regulating an operation for starting the engine 12 is released. When the operation for starting the engine 12 is performed, the control signal is transmitted to the ECU 26 to start the engine 12. The determination module 25 is assumed to be constituted of a microcomputer and the like arranged separately from the smart key unit 22. Alternatively, the determination module 25 may be formed inside the smart key unit 22, or may be formed inside the ECU 26.

In the smart key unit 22 according to the present embodiment, as illustrated in FIG. 6, an operation module 23 that can operate the engine 12 (driving source) to start is arranged on one end face (an end face on the right side in FIG. 6) in a longitudinal direction M, and a cable connector 24 that can be electrically connected to other electric components included in the motorcycle (specifically, the determination module 25, the ECU 26, and the like) is arranged on the other end face (an end face on the left side in FIG. 6). A lock mechanism and the like are arranged inside the smart key unit 22, the lock mechanism and the like for locking the operation of the operation module 23 in a state in which an ignition switch or the determination module 25 does not receive the normal ID code.

An operation knob 23*a* that can be optionally operated by the driver is attached to the operation module 23, and an operation of the operation knob 23*a* is locked in a state in which the determination module 25 does not receive the normal ID code. When the determination module 25 receives the normal ID code and the control signal is transmitted, the lock of the operation knob 23*a* is released and a rotation operation is enabled. In such an unlocked state, when the operation knob 23*a* is operated to rotate from an OFF position to a start position, the engine 12 is started.

To the cable connector 24, a distal end of a cable C extended from the determination module 25 and the ECU 26 can be connected. As described above, the cable connector 24 is attached to the end face opposite to the operation module 23 (the other face in the longitudinal direction M of the smart key unit 22). Thus, the smart key unit 22 can receive the control signal transmitted from the determination module 25 via the cable C connected to the cable connector 24, and can transmit the control signal for starting the engine to the ECU 26.

Additionally, the motorcycle according to the present embodiment includes a head pipe 18 that supports a steering shaft I (refer to FIG. 7) in a rotatable manner As illustrated in FIGS. 7 and 9, on the head pipe 18, a stay 20 is formed that inclines toward a rear side of the vehicle (inclines at a predetermined angle from a front side of the vehicle to the rear side of the vehicle) and supports the smart key unit 22, a main frame 19 is extended toward the rear side of the vehicle, and the leg shield 3 (refer to FIG. 13) is attached at a position closer to the rear side of the vehicle than the smart key unit 22 supported by the stay 20.

Thus, in the present embodiment, as illustrated in FIG. 7, a space surrounded by the head pipe 18, the main frame 19, and the leg shield 3 is formed, and the space is prepared as a housing space S that can house cables extended from the smart key unit 22 and other electric components included in the vehicle (the cable C extended from the smart key unit 22 and a cable D extended from other electric components).

As illustrated in FIG. 10, the smart key unit 22 is configured to be fixed to the stay 20 of the head pipe 18 with a screw and the like, and to be able to be exposed to the outside through a window part 3a formed on the leg shield 3 as illustrated in FIG. 6. As illustrated in FIG. 5, the smart key unit cover 5 (refer to FIG. 12) is attached to the leg shield 3, the smart key unit cover 5 closing the window part 3a and covering a part of the smart key unit 22 close to the rear side of the vehicle.

Specifically, when the leg shield 3 is attached in a state in which the smart key unit 22 is attached to the stay 20, the smart key unit 22 is caused to be exposed to the outside through the window part 3a, and an extended part 21 formed to project from the stay 20 toward the rear side of the vehicle and a cover fitted portion 21a formed on a tip of the extended part 21 are also caused to be exposed to the outside through the window part 3a. When the smart key unit cover 5 is attached to the cover fitted portion 21a with a screw n (refer to FIG. 12), as illustrated in FIG. 5, the window part 3a is closed by the smart key unit cover 5 and the smart key unit 22 excluding the operation module 23 is covered.

To the smart key unit cover 5, a protection cover B for covering the screw n is attached to prevent the screw n from being visually recognized from the outside. On the smart key unit cover 5, as illustrated in FIG. 12, wind bleeding holes 5a through which traveling wind from the front side of the vehicle can flow are formed. The wind bleeding holes 5a are a pair of holes formed at a lower part of the smart key unit cover 5, and are open toward the window part 3a in a state in which the smart key unit cover 5 is attached to the leg shield 3. In addition, on the leg shield 3, a pair of recessed parts 5b are formed at positions corresponding to the wind bleeding holes 5a. The recessed parts 5b and the protection cover B form gaps therebetween. Accordingly, the traveling wind passed through the wind bleeding holes 5a blows toward the rear side of the vehicle.

As illustrated in FIG. 8, the head pipe cover 4 is attached at a position to cover the periphery of the head pipe 18, and is rotatable interlocking with the steering shaft I when the vehicle is steered. A covering member 2 (refer to FIGS. 8 and 14) is attached at a position that is on the rear side of the vehicle of the head pipe cover 4 and on the front side of the vehicle of the smart key unit 22. Accordingly, in a case in which the head pipe cover 4 is rotated together with the steering shaft I when the vehicle is steered, and a gap is generated between the head pipe cover 4 and the leg shield 3 as illustrated in FIG. 11, part of the covering member 2 is positioned in the gap, so that unauthorized access to the smart key unit 22 from the front side of the vehicle via the gap can be securely prevented.

In the motorcycle according to the present embodiment, the smart key unit 22 is attached at a position in the rear of the head pipe 18 included in the vehicle, and the smart key unit 22 is fixed to the stay 20 in a state in which the longitudinal direction M thereof is substantially orthogonal to a back and forth direction of the vehicle as illustrated in FIGS. 6 and 10. Specifically, the smart key unit 22 according to the present embodiment is attached at a position in the rear of the head pipe 18, and fixed to the stay 20 in a state in which the longitudinal direction M thereof is substantially orthogonal to the back and forth direction of the vehicle, and the longitudinal direction M thereof is substantially parallel with a width direction (horizontal direction) of the vehicle.

According to the present embodiment, the smart key unit 22 is attached at a position in the rear of the head pipe 18 included in the vehicle, and the smart key unit 22 is arranged in a state in which the longitudinal direction M thereof is substantially orthogonal to the back and forth direction of the vehicle, so that a clearance for preventing interference during steering can be secured while suppressing increase in a projecting dimension in the back and forth direction of the vehicle around the head pipe 18, and the size of the attachment structure of the smart key unit 22 around the head pipe 18 can be reduced. Specifically, the smart key unit 22 is arranged in a state in which the longitudinal direction M thereof is substantially parallel with the width direction of the vehicle, so that the size of the attachment structure of the smart key unit 22 around the head pipe 18 can be reduced while improving operability for the smart key unit 22.

The smart key unit cover 5 for covering a part of the smart key unit 22 close to the rear side of the vehicle is attached to the vehicle, and the wind bleeding holes 5a through which traveling wind from the front side of the vehicle can flow are formed on the smart key unit cover 5, so that traveling wind flowed into the smart key unit cover 5 from the front side of the vehicle when the vehicle is traveling can be flowed out through the wind bleeding holes 5a, and traveling performance can be maintained by suppressing disturbance of air flow during traveling.

In the smart key unit 22 according to the present embodiment, the operation module 23 (operation knob 23a and the like) that can operate the engine 12 (driving source) to start is arranged on one end face in the longitudinal direction M thereof, and the cable connector 24 that can be electrically connected to other electric components included in the motorcycle is arranged on the other end face, so that the operation module 23 and the cable connector 24 are positioned along the horizontal direction (vehicle width direction) on the rear side of the vehicle in the head pipe 18, and increase in the projecting dimension in the back and forth direction of the vehicle around the head pipe 18 can be further suppressed.

Additionally, on the head pipe 18, the stay 20 is formed that inclines toward the rear side of the vehicle and supports the smart key unit 22, the main frame 19 is extended toward the rear side of the vehicle, and the leg shield 3 is attached at a position closer to the rear side of the vehicle than the smart key unit 22 supported by the stay 20, and the space surrounded by the head pipe 18, the main frame 19, and the leg shield 3 is prepared as the housing space S that can house the cables (C, D) extended from the smart key unit 22 and the other electric components included in the vehicle, so that a dead space positioned below the smart key unit 22 can be effectively utilized as an accommodation space for the cables (C, D).

The embodiment has been described above, but the present invention is not limited thereto. For example, the smart key unit 22 may include the operation module 23 different from the operation knob 23a (a push button, a seesaw type switch knob, and the like, all referred to collectively as "members"). For example, the smart key unit 22 may be arranged in a state in which the longitudinal direction M thereof is substantially parallel with the vertical direction instead of being arranged in a state in which the longitudinal direction M thereof is substantially parallel with the width direction of the vehicle as described in the present embodiment so long as the smart key unit 22 is attached at a position on the rear side of the head pipe 18 included in the vehicle and is arranged in a state in which the longitudinal direction M thereof is substantially orthogonal to the back and forth direction of the vehicle. Furthermore, the smart key unit for a motorcycle is sufficient if capable of performing predetermined authentication by communicating with a smart key that is able to be carried by a driver, and the information transmitted and received between the smart key unit may be different from the ID code.

INDUSTRIAL APPLICABILITY

The present invention can be applied to an attachment structure of a smart key unit for a motorcycle having different external appearance or an attachment structure to which another function is added so long as a smart key unit is attached at a position on a rear side of a head pipe included in a vehicle and the smart key unit is arranged in a state in which a longitudinal direction thereof is substantially orthogonal to a back and forth direction of a vehicle.

REFERENCE SIGNS LIST

1 Handle cover
2 Covering member
3 Leg shield
3a Window part
4 Head pipe cover
5 Smart key unit cover
5a Wind bleeding hole
5b Recessed part
6 Front fender
7 Rear fender
8 Seat
9 Side cover
10 Headlight
11a Throttle grip
11b Holding grip
12 Engine (driving source)
13 Belt converter cover
14 Rear light
15 Front fork
16 Rear fork
17 Meter
18 Head pipe
19 Main frame
20 Stay
21 Extended part
21a Cover fitted portion
22 Smart key unit
23 Operation module
23a Operation knob
24 Cable connector
25 Determination module
26 ECU
K Smart key
B Protection cover
M Longitudinal direction
S Housing space
C Cable
I Steering shaft
R1 Front wheel
R2 Rear wheel

The invention claimed is:

1. An attachment structure of a smart key unit for a motorcycle that is capable of performing predetermined authentication by communicating with a smart key that is able to be carried by a driver, wherein
the smart key unit is attached at a position in the rear of a head pipe configured to support a steering shaft in a rotatable manner, above a main frame extending backward from the head pipe, and the smart key unit is attached to a stay extending backward from the head pipe and supporting the smart key unit, and
the smart key unit is arranged in a state in which a longitudinal direction of the smart key unit is substantially orthogonal to a back and forth direction of the motorcycle.

2. The attachment structure of the smart key unit for a motorcycle according to claim 1, wherein the smart key unit is arranged in a state in which the longitudinal direction of the smart key unit is substantially parallel with a width direction of the motorcycle.

3. The attachment structure of the smart key unit for a motorcycle according to claim 2, wherein
an operation module that is able to operate a driving source of the motorcycle to start is arranged on one end face in a longitudinal direction of the smart key unit, and
a cable connector that is able to be electrically connected to other electric components included in the motorcycle is arranged on the other end face of the smart key unit.

4. The attachment structure of the smart key unit for a motorcycle according to claim 3, wherein
on the head pipe,
a leg shield is attached at a position closer to the rear side of the motorcycle than the smart key unit supported by the stay, and
a space surrounded by the head pipe, the main frame, and the leg shield is prepared as a housing space that is able to house cables extended from the smart key unit and other electric components included in the motorcycle.

5. The attachment structure of the smart key unit for a motorcycle according to claim 2, wherein
on the head pipe,
a leg shield is attached at a position closer to the rear side of the motorcycle than the smart key unit supported by the stay, and
a space surrounded by the head pipe, the main frame, and the leg shield is prepared as a housing space that is able to house cables extended from the smart key unit and other electric components included in the motorcycle.

6. The attachment structure of the smart key unit for a motorcycle according to claim 1, wherein
an operation module that is able to operate a driving source of the motorcycle to start is arranged on one end face in a longitudinal direction of the smart key unit, and
a cable connector that is able to be electrically connected to other electric components included in the motorcycle is arranged on the other end face of the smart key unit.

7. The attachment structure of the smart key unit for a motorcycle according to claim 6, wherein
on the head pipe,
a leg shield is attached at a position closer to the rear side of the motorcycle than the smart key unit supported by the stay, and
a space surrounded by the head pipe, the main frame, and the leg shield is prepared as a housing space that is able to house cables extended from the smart key unit and other electric components included in the motorcycle.

8. The attachment structure of the smart key unit for a motorcycle according to claim 1, wherein
on the head pipe,
a leg shield is attached at a position closer to the rear side of the vehicle than the smart key unit supported by the stay, and
a space surrounded by the head pipe, the main frame, and the leg shield is prepared as a housing space that is able to house cables extended from the smart key unit and other electric components included in the motorcycle.

9. The attachment structure of the smart key unit for a motorcycle according to claim 1 wherein the stay is attached to and disposed adjacent to the rear of the head pipe.

10. The attachment structure of the smart key unit for a motorcycle according to claim 1 wherein the smart key unit is configured to wirelessly communicate with the smart key disposed in spaced relation apart from the smart key unit during operation of the motorcycle.

11. The attachment structure of the smart key unit for a motorcycle according to claim 10 wherein the smart key unit includes an operation member that remains attached to the smart key unit at all times, the operation member being movable for starting a driving source of the motorcycle.

* * * * *